US011487560B2

(12) United States Patent
Utsch

(10) Patent No.: US 11,487,560 B2
(45) Date of Patent: *Nov. 1, 2022

(54) METHOD AND SYSTEM FOR THE DISTRIBUTION OF SYNCHRONIZED VIDEO TO AN ARRAY OF RANDOMLY POSITIONED DISPLAY DEVICES ACTING AS ONE AGGREGATED DISPLAY DEVICE

(71) Applicant: Thomas Frederick Utsch, Allentown, PA (US)

(72) Inventor: Thomas Frederick Utsch, Allentown, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/531,932

(22) Filed: Nov. 22, 2021

(65) Prior Publication Data

US 2022/0083356 A1 Mar. 17, 2022

Related U.S. Application Data

(63) Continuation of application No. 16/815,308, filed on Mar. 11, 2020, now Pat. No. 11,210,114, which is a continuation-in-part of application No. 15/676,406, filed on Aug. 14, 2017, now Pat. No. 10,607,571.

(60) Provisional application No. 62/442,754, filed on Jan. 5, 2017, provisional application No. 62/385,452, filed
(Continued)

(51) Int. Cl.
| | |
|---|---|
| *G06F 3/16* | (2006.01) |
| *G06F 3/0482* | (2013.01) |
| *G06F 3/0488* | (2022.01) |
| *G06F 9/451* | (2018.01) |
| *H04L 67/104* | (2022.01) |
| *G06F 3/04883* | (2022.01) |

(Continued)

(52) U.S. Cl.
CPC ............ *G06F 9/452* (2018.02); *G06F 3/0482* (2013.01); *G06F 3/0488* (2013.01); *G06F 3/04883* (2013.01); *G06F 3/167* (2013.01); *G06F 9/451* (2018.02); *H04L 65/65* (2022.05); *H04L 67/104* (2013.01); *H04L 67/131* (2022.05)

(58) Field of Classification Search
CPC .... G06F 9/452; G06F 3/0482; G06F 3/04883; G06F 3/167; G06F 3/1446; H04L 65/608; H04L 67/104; H04L 67/38; H04L 65/4015; H04L 67/10; H04L 65/80; H04M 1/72403; H04M 1/72412; G09G 5/399; G09G 2300/026; G09G 2356/00; G09G 2360/04; G09G 2370/022; G09G 2370/025; G09G 2370/06; G09G 2370/16; H04N 21/41407; H04N 21/43076; H04N 21/632; H04W 4/06
See application file for complete search history.

(56) References Cited

U.S. PATENT DOCUMENTS

| | | |
|---|---|---|
| 9,271,137 B2 | 2/2016 | Chan et al. |
| 9,298,362 B2 | 3/2016 | Lucero et al. |
| 9,715,506 B2 | 7/2017 | Rosen et al. |

(Continued)

*Primary Examiner* — Vijay Shankar

(57) ABSTRACT

A system and method for sharing information amongst user display devices, such as cell phones, smart phones, tablet computers, or other devices with an electronically controllable screen or display, in a peer to peer (P2P) network, to display one image or video across the totality of all of the display devices, regardless of where the display devices are positioned or how they are oriented relative to each other, and a system and method for identifying the exact position and orientation of each display device.

38 Claims, 7 Drawing Sheets

Related U.S. Application Data on Sep. 9, 2016, provisional application No. 62/376,866, filed on Aug. 18, 2016.

(51) Int. Cl.
*H04L 65/65* (2022.01)
*H04L 67/131* (2022.01)

(56) References Cited

U.S. PATENT DOCUMENTS

| | | |
|---|---|---|
| 9,716,855 B2 | 7/2017 | Gehring et al. |
| 9,912,846 B2 | 3/2018 | Yamada et al. |
| 9,961,295 B2 | 5/2018 | Takada |
| 10,607,571 B2 | 3/2020 | Utsch |
| 11,210,114 B2 * | 12/2021 | Utsch ................ G06F 3/0482 |
| 2005/0083642 A1 | 4/2005 | Senpuku et al. |
| 2012/0206319 A1 | 8/2012 | Lucero et al. |
| 2015/0084837 A1 | 3/2015 | Mese |
| 2015/0172594 A1 | 6/2015 | Takada |
| 2017/0344330 A1 | 11/2017 | Masumoto |

* cited by examiner

METHOD AND SYSTEM FOR THE DISTRIBUTION OF SYNCHRONIZED VIDEO TO AN ARRAY OF RANDOMLY POSITIONED DISPLAY DEVICES ACTING AS ONE AGGREGATED DISPLAY DEVICE

CROSS-REFERENCE TO RELATED APPLICATIONS

This application is a continuation of U.S. Ser. No. 16/815,308 filed Mar. 11, 2020 which is a continuation in part of U.S. Ser. No. 15/676,406 filed Aug. 14, 2017, now U.S. Pat. No. 10,607,571, which claims the benefit of U.S. Provisional Applications 62/376,866 filed Aug. 18, 2016 and entitled "Sqramble", U.S. 62/385,452 filed Sep. 9, 2016 and entitled "Sqramble Video", and U.S. 62/442,754 filed Jan. 18, 2017 and entitled "Sqramble Video Advertising Integration," the entirety of which are incorporated herein by reference.

FIELD

The present invention relates to a system and method for using multiple display devices, such as cell phones, smart phones, tablet computers, or other devices with an electronically controllable screen or display, to display one image or video across the totality of all of the display devices, regardless of where the display devices are positioned or how they are oriented relative to each other. The invention also provides a system and method for identifying the exact position and orientation of each display device. It further provides a system and method for displaying an advertising banner or border overlayed on the image or video across the totality of the display devices.

BACKGROUND

As data rates to mobile devices continue to get faster and small cameras attached to cell phones and tablets get better in terms of image quality, more and more people regularly watch images or videos on their cell phones and tablets. Due to the screen sizes of these devices, it can be difficult to clearly see the details of the image or video and to share the experience of watching the video together with other people. Also the limited size of the display screens on the devices makes it difficult to display an advertising border or banner simultaneously with the video. Prior art systems have utilized an array of television sets mounted together to display a composite image across the collective screens of the television sets. However, proper display of the composite image in such prior art systems has required an advance specification or prior knowledge of where each television set is located in the array. That is, prior art television arrays for displaying composite images have required advance knowledge of where each television screen is positioned in the array and how it is oriented relative to the composite image, in order to determine what particular portion of the composite image is going to be generated on the screen of each television set.

All references cited herein are incorporated herein by reference in their entireties.

BRIEF SUMMARY

The present invention is directed to a method and system that allow a group of people to each contribute their individual cell phone or tablet or other similar display device to a composite display, by placing all of the devices together in ad hoc fashion to form a large array or mosaic, and then to watch a video or image that is displayed across the entire array of devices such that the video or image plays in synchronization using the total array as one screen. In contrast to prior art television arrays for displaying composite images, the system of the present invention enables a composite display or image to be generated on the fly, without prior specification or knowledge of which device is located where in the device array or how the device is oriented in relation to other devices used to generate the composite display.

Most modern smartphones are used to take portrait-oriented videos, whereas most available computer displays are landscape-oriented. This invention accordingly further allows for the display area created by the collective display devices to map to the orientation and aspect ratio of the source video. The invention then enables user generated videos which are circular in shape to be used in creating the composite display, including a composite display with an advertising banner or border.

Generally speaking, exemplary embodiments of the present invention enable users with a smart phone to set all of their phones on a table in an ad hoc array/mosaic where they generally are positioned adjacent to one another, either vertically or horizontally or in a mixture of orientations, and then watch a video from one of the users played using the entire array of smart phones as one contiguous display.

For example in one embodiment the user whose video is being played serves as the controller, cueing up the video to be played and initiating a display session. The other users log into the session from their respective smartphones and then place all of their phones on the table to form a large array either rectangular, square, or round in shape. Each smartphone is sent a unique identifying symbol which is displayed on its respective smartphone screen. The controller user takes a picture of the array of smartphones and uploads the picture. The invention analyzes the unique identifier on each smartphone screen and determines the size, relative position, and orientation of each smartphone. The invention next maps the source video to the size and shape of the smartphone array so as to maximize the display of the video, keeping the original aspect ratio. The invention then sends the appropriate extract of the total source video to each smartphone and synchronizes the playback of the video such that the video plays over the totality of the smartphones and is viewable as the original source video. One user indicates that his/her smartphone will provide audio and the audio is played through that smartphone. Additional videos can be played or replayed through the same session once initiated, until all of the users remove their smartphones.

Furthermore, the disclosure provides for a system and method for capturing information, such as rolling audio, video, or displays, on a smartphone or other handheld device. It is not limited to handheld devices and will work with any electronic device or computer having a camera. As disclosed herein this works by allowing the, for example, video camera to run while buffering the information stream in a system of buffers. A user indicates by, for example, touch gesture or voice command when to start a clip. The clip is typically preset to a certain number of seconds or minutes. The application as disclosed herein can then receive, for example, metadata concerning the clip and create one of various types of output files.

The present disclosure uses a reactive method for recording information that combines information capture, touch-screen, voice-control technologies into an integrated system that produces cleanly edited, short-duration, compliant multimedia files, such as for example, video files, that exactly captures a moment after it has actually happened.

The present disclosure places the device in a state that is always ready to capture video up to N seconds or minutes in the past (where N depends on available system memory and can be set by the user). For example, 20 seconds, 40 seconds, or 60 seconds. This enables the user to run the system indefinitely without having to worry about running out of storage.

In certain embodiments the user relies on touch gestures and voice commands to actually initiate captures without having to actually monitor the system itself, thereby allowing for complete focus on the live action itself. When the user sees something happen, he or she can use the appropriate voice or touch command to cause the system create a recorded file based on time points derived from the user's commands.

The disclosure provides a system and method for sharing information amongst user display devices in a peer to peer (P2P) network, the method comprising: providing a plurality of user display devices wherein said user display devices are mobile or portable and which are capable of wireless communications; establishing said user display devices as nodes of a wireless P2P network, providing an application on said user display devices, wherein said application gives each user of a respective user display device the ability to select information to be shared amongst the other user display devices in the P2P network; selecting the information to be shared over the P2P network by one of the users using his/her respective user display device; and wherein said selected information is shared over the P2P network as an information transmission using the application, said information comprising a multimedia file selected from the group consisting of voice data, media files, image files, audio files, game images, screen images, a virtual world, an augmented reality, a game, a videogame, on-screen content, broadcast programming, a mixed reality other rendered environment, metadata, and combinations thereof. The disclosure provides a system and method wherein each of said user display devices is selected from the group consisting of mobile telephones, smart tablet computers, laptop computers, portable gaming devices, portable Internet devices, personal digital assistant devices, wearable devices, smart watches, smart glasses, headphones, pendants, earpieces, any electronic, computing, and/or telecommunications device capable of wireless communication. The disclosure provides a system and method wherein the P2P network is any one of a structured network, a predefined network, a hybrid P2P network, an ad hoc P2P network, an unstructured network, or a combination thereof.

The disclosure provides a system and method wherein said information is shared amongst user display devices in the P2P network without use of a server. The disclosure provides a system and method where any one of the users can choose any portion of said information being transmitted to receive and retransmit, without using a server. The disclosure provides a system and method wherein said information is shared amongst certain user display devices which are separated from each other by multiple hops in the P2P network. The disclosure provides a system and method wherein the P2P network is formed using a means selected from the group consisting of Bluetooth connections, WiFi connections, and combinations thereof. The disclosure provides a system and method wherein a local network is a P2P ad-hoc network that is dynamically formed between user display devices in said local network. The disclosure provides a system and method wherein said P2P network is an ad hoc network formed between user display devices, wherein the user display devices cooperatively route traffic amongst themselves. The disclosure provides a system and method wherein a portion of said user display devices are separated from each other by multiple hops in the ad hoc network. The disclosure provides a system and method wherein said P2P network includes at least some user display devices separated from each other by multiple hops in the network. The disclosure provides a system and method wherein said application is configured for sharing information with said other user display devices in real time with less than 100 ms latency over said wireless P2P network.

The disclosure provides a system and method wherein said application is configured for retransmitting information transmissions received over said P2P network from one or more user display devices to additional user display devices connected on said P2P network. The disclosure provides a system and method wherein said application is configured for mirroring a first user display device screen, a video camera associated with said first user display device, a microphone associated with said first user display device, or any multi-media application associated with said first user device to form mirrored content, and sharing said mirrored content over said P2P network. The disclosure provides a system and method wherein said application is configured for recording said mirrored content. The disclosure provides a system and method wherein said mirrored content comprises a duration of time selected from the group consisting of 20 seconds, 40 seconds, and 60 seconds long. The disclosure provides a system and method wherein mirrored content can be saved directly to said first user's display device, or transmitted to other user's display devices over said P2P network without using a server.

The disclosure provides a system and method said mirrored content can be recorded on said first user's display device based on a user command selected from the group consisting of the first user tapping a button, the first user user tapping one or more buttons, the first user tapping on an icon on said first user's display device screen, a gesture of the first user, shaking said user display device by the first user, an audible instruction or command issued by the first user, and combinations thereof. The disclosure provides a system and method wherein said multimedia file is a videogame or a performance. The disclosure provides a system and method wherein said multimedia file is a recording of the performance of test software that is configured for analysis of said test software performance to record software failure. The disclosure provides a system and method wherein said multimedia file is distributively generated by a subset of user devices on said P2P network. The disclosure provides a system and method wherein said multimedia file is distributed by a user display device. The disclosure provides a system and method wherein the multimedia file is requested by other user display devices on said P2P network.

The disclosure provides a system and method wherein said user command is actuated by touching a touch screen portion of said first user's display device. The disclosure provides a system and method wherein said user command is actuated by a virtual button on said first user's display device. The disclosure provides a system and method wherein said user command is a spoken command into a microphone associated with said first user's display device. The disclosure provides a system and method wherein said user command is a hold and release touch to said touch screen, wherein said application only begins to save information for a predetermined number of seconds before the first user activates said virtual button in said touch screen and said application stops saving information when the first user releases said virtual button. The disclosure provides a system and method wherein said predetermined number of seconds is selected form the group consisting of 20 seconds, 40 seconds, and 60 seconds.

BRIEF DESCRIPTION OF SEVERAL VIEWS OF THE DRAWINGS

The invention will be described in conjunction with the following drawings in which like reference numerals designate like elements and wherein.

DETAILED DESCRIPTION

Figure 1:
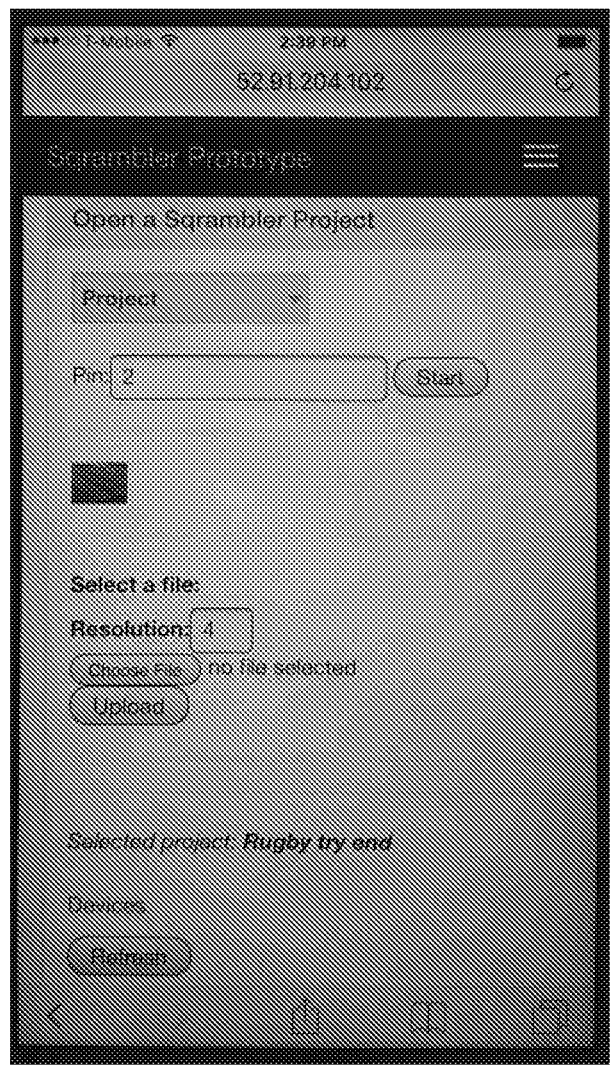
FIG. 1 is an exemplary embodiment of the controller device or smartphone.
Figure 2:
FIG. 2 is an exemplary embodiment of one of the non-controller devices logged in to the array.

The following is a description of exemplary embodiments of the invention, augmented by the included drawings. The embodiments are examples and are described in such detail as to clearly communicate the invention. However, the amount of detail offered is not intended to limit the anticipated variations of embodiments; on the contrary, the intention covers all modifications, equivalents, and alternatives falling within the spirit and scope of the present invention as defined by the appended claims. The descriptions and drawings below are designed to make such embodiments obvious to a person of ordinary skill in the art.

As used herein the term "Processing Element" refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

As used herein the term "Memory Medium" means any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

As used herein the term "Carrier Medium" means a memory medium as described above, as well as a physical transmission medium, such as a bus, network, and/or other physical transmission medium that conveys signals such as electrical, electromagnetic, or digital signals.

As used herein the term "Computer System" means any of various types of computing or processing systems, including a personal computer system (PC), mainframe computer system, workstation, network appliance, Internet appliance, personal digital assistant (PDA), user display device, television system, grid computing system, or other device or combinations of devices. In general, the term "computer system" can be broadly defined to encompass any device (or combination of devices) having at least one processor that executes instructions from a memory medium.

As used herein the terms, for example, "user device", "display device", "user display device", and "mobile device", refers, for example, to any of various types of computer systems and/or devices which are mobile or portable and which performs wireless communications using, for example, WLAN communication. Examples of mobile devices include mobile telephones or smart phones (e.g., iPhone®, Android®-based phones), and tablet computers such as iPad®, Samsung Galaxy®, etc. Various other types of devices would fall into this category if they include Wi-Fi or both cellular and Wi-Fi communication capabilities, such as laptop computers (e.g., MacBook®), portable gaming devices (e.g., Nintendo DS®, PlayStation Portable®, Gameboy Advance®, iPhone®), portable Internet devices, and other handheld devices, as well as wearable devices such as smart watches, smart glasses, headphones, pendants, earpieces, etc. The terms "user display device", "user device", "display device", and "mobile telephone" or "mobile terminal," as used herein, may include, for example, a cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver, and can represent a variety of suitably configured devices including cell phones, personal computers, tablets, phablets, kiosks, vehicles, appliances, game consoles, or other devices. Mobile terminals may also be referred to as "pervasive computing" devices. Examples of computing platforms that can be suitably adapted for use with the inventive subject matter within the device include those based on Linux, Mac OS, Microsoft, Solaris, Android, BlackBerry OS, iOS, Embedded Linux, Palm OS, WebOS, Windows Mobile, VxWorks, or other suitable computing platforms that can run object recognition engines. In general, the term "user device", "display device", and "mobile device" can be broadly defined to encompass any electronic, computing, and/or telecommunications device (or combination of devices) which is easily transported by a user and capable of wireless communication using, for example, Bluetooth, WLAN or Wi-Fi.

As used herein the term "Wireless Device" or "Wireless Station" means any of various types of computer systems and/or devices which perform wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV®, Roku®, Amazon FireTV®, Google Chromecast®, etc.), refrigerators, laundry machines, thermostats, and so forth.

As used herein the term "WLAN" includes a wireless communication network or RAT that is serviced by WLAN access points and which provides connectivity through these access points to the Internet. Most modem WLANs are based on IEEE 802.11 standards and are marketed under the name "Wi-Fi". A WLAN network is different from a cellular network.

As used herein the terms Neighbor Awareness Networking (NAN) data link (NDL) refers to a communication link between peer wireless stations (e.g., peer NAN devices). Note that the peer devices may be in a common (e.g., same) NAN cluster. In addition, a NAN data link may support one or more NAN datapaths between peer wireless stations. Note further that a NAN data link may only belong to a single NAN data cluster.

As used herein the terms NAN datapath (NDP) refers to a communication link between peer wireless stations that supports a service. Note that one or more NAN datapaths may be supported by a NAN data link. Additionally, note that a NAN datapath supports a service between wireless stations. Typically, one of the peer wireless stations will be a publisher of the service and the other peer wireless station will be a subscriber to the service.

In certain embodiments, the user display device, controller device, display device, user device, and/or other electronic device, such as a cellular phone or personal digital assistant (PDA) can communicate using a cellular Wireless Wide Area Network (WWAN) such as Code Division Multiple Access (CDMA), GSM, UMTS, HSPA, EVDO, etc.; a Wireless Personal Area Network (WPAN) such as Bluetooth, Ultra Wide Band (UWB), wireless USB (wUSB), etc.; a short range Wireless Local Area Network (WLAN) such as WiFi, etc.; a Wireless Metropolitan Area Network (WMAN) such as WiMAX, as well as other wireless technologies, e.g., Global Positioning Satellite (GPS), Near Field Communication (NFC), Digital Video Broadcast (DVB), etc.

In certain embodiments as disclosed herein, the application can reside on a plurality of, for example, user display devices, and information such as video information can be shared amongst display devices without the use of any kind of a network or server, such as over a peer to peer network.

In a multiuser environment, each user can choose among available transmissions to receiving and retransmission, without the necessity of using a network or server.

In certain embodiments as disclosed herein, the application will allow for sharing of multimedia files, such as e.g., video and/or audio information, from user devices, such as a user display device to other user display devices using a wireless capacity, for example in a cascade, without the need to use a network or server.

In certain embodiments as disclosed herein, the information is a multimedia file selected from the group consisting of, for example, voice data, media files, image files, audio files, game images, screen images, a virtual world, an augmented reality, a game, a videogame, on-screen content, broadcast programming, a mixed reality or other rendered environment, or metadata.

In certain embodiments as disclosed herein, the application allows for the capability to mirror one user display device screen and audio to multiple other user display devices in real time with less than, for example, a 100 ms latency, including the mirroring of, for example, a video camera.

Another aspect is directed to a method including connecting to a local peer-to-peer network; receiving an information file over the peer-to-peer network; and exchanging payment or license information for the information file over a wide area network.

Additionally, receiving the information file over the peer-to-peer network may further include determining whether the information file is available on the peer-to-peer network; receiving the information file over the peer-to-peer network when the information file is determined to be available on the peer-to-peer network; and receiving the information file over the wide area network when the information file is not available on the peer-to-peer network.

Additionally, the local peer-to-peer network is a network of mobile terminals and receiving the information file over the peer-to-peer network further includes receiving the information file at a first mobile terminal from a second mobile terminal, the second mobile terminal being separated from the first mobile terminal by at least two hops in the peer-to-peer network.

Additionally, the local peer-to-peer network may be formed via Bluetooth connections and the wide area network may be formed as a cellular telephone network.

Additionally, the information file may be a multi-media file.

Additionally, the local peer-to-peer network may be a higher bandwidth network than the wide area network.

In another aspect, a method includes dynamically forming a local network of mobile terminals; exchanging files over the local network when the files are available in the local network; receiving the files from a cellular network when the files are not available on the local network; and exchanging payment or license information for the files over the cellular network when the files are exchanged over the local network.

Additionally, the method further includes exchanging payment or license information for the files over the cellular network when the files are received over the cellular network.

Additionally, the local network may be a peer-to-peer ad-hoc network that is dynamically formed between mobile terminals in the cellular network. Additionally, the ad-hoc network includes at least some mobile terminals separated from each other by multiple hops in the ad-hoc network. Additionally, the local network may be formed via Bluetooth connections. Additionally, the files may be multi-media files. The local network may be a higher bandwidth network than the cellular network. Various mobile terminals such as user display devices may move in and out of proximity of one another as the user carrying the user display device moves about. In certain embodiments, a user display device includes Bluetooth connectivity. Bluetooth is a radio standard primarily designed for low power consumption and tends to have a relatively short range of approximately 1 meter, 10 meters, or 100 meters, depending on the Bluetooth power class of the mobile terminal.

Users of mobile terminals such as user display devices may dynamically connect with one another to form local networks as the users move into range of one another. In one implementation, the local networks may be formed as ad-hoc peer-to-peer networks. Ad hoc networks are generally known in the art. In an ad-hoc network of mobile terminals, the mobile terminals cooperatively route traffic amongst themselves. Ad-hoc networks are usually wireless networks. Nodes (i.e., mobile terminals such as user display devices) in these networks may not be permanent: they are instead based on physical proximity at any given point in time. The network adjusts dynamically to changing node structure, which may result from node mobility or failure.

In an ad-hoc network, some or all of the mobile terminals such as user display devices in the ad-hoc network may be capable of network routing functions and others may be merely sources or destinations for data traffic. All or some of the mobile terminals such as user display devices in the ad-hoc network may execute a set of algorithms, and perform a set of networking protocols, that enable the mobile terminals to find each other, determine paths through the network for data traffic from source to destination(s), and detect and repair ruptures in the ad-hoc network, for example, as nodes move, as they fail, as battery power changes, or as communication path characteristics change over time.

The local peer-to-peer networks formed by groups of mobile terminals such as user display devices may be used to transfer files (or any other unit of data), such as media files, image files, or other information between mobile terminals in a local network.

The formation of local networks and use of the local networks as described above can be useful in numerous situations. Consider, for example, a user that has a mobile terminal that has the capability to store and play songs. The user may wish to download a new song to the mobile terminal. If the user is in a crowded area and the song is a fairly popular song, there is a good chance that there is a user either within direct range of a local connection of the user (e.g., within approximately 100 meters for a Bluetooth class I device) or within "indirect" range of the local connection. Indirect range, as used herein, refers to another user that is accessible via multiple hops on the local network (e.g., mobile terminals 320-B and 320-D in FIG. 3). In either case, the user may then download the song over the local network and exchange payment/licensing information, if necessary, over the cellular network.

As an alternate situation to the one discussed in the previous paragraph, consider the situation in which the mobile terminals are "strangers" or are otherwise not allocated to predetermined groups. In this situation, which was generally described above with reference to the ad-hoc networks, the mobile terminals may connect with one another by broadcasting their presence, and potentially the information desired, using their short range transceiver (e.g., Bluetooth or WiFi transceiver). A nearby mobile terminal may then choose whether to respond and supply the desired data and/or connect to the local network. Another way of connecting for mobile terminals that are not allocated to predetermined groups is for the cellular network to broadcast the location of a first mobile terminal to other mobile terminals in the vicinity of the first mobile terminal. The other mobile terminals may then elect whether to join the local network by connecting with the first mobile terminal using the short range transceiver.

In certain embodiments as disclosed herein, the application as the ability to record a rolling window of information such as video, for example 20, 40, or 60 seconds long, of whatever is on the screen of the users display device. This captured information can be saved directly to the display device, or transmitted to additional display devices of one or more users without the necessity for a network or server. In certain embodiments as disclosed herein, information, such as a rolling video and/or audio would be recorded based on a tap on the button, tap on an icon on the display device screen, or some other kind of gesture for example shaking the phone. This can be used in scenarios, for example to share a recording performance and videogame, to using software testing to capture the time when example an application does not perform correctly in user's record what happened leading to failure.

The present disclosure provides a system and method, such as an application for using a rolling buffer set including a main buffer and a pre-roll buffer to provide unlimited operation against a finite amount of memory. On startup, both the main and pre-roll buffers are allocated in storage, typically disk storage or its equivalent, and left in a write-ready state. The system interacts with the user device screen to store the video stream of the screen into the main buffer first. As the main buffer approaches capacity, the system switches to the pre-roll buffer without dropping video frames, or other information. The pre-roll buffer is designed to hold only a few seconds of video, just enough time for the main buffer to be closed and re-opened for writing (i.e., purged), for example, 20 seconds, 40 seconds, or 60 seconds. If there are any pieces of the main buffer that need to be preserved based on a requested clipping action, those pieces are excised and preserved before the purge operation. When the main buffer is empty and ready, the system redirects the video stream back to the main buffer again without losing a frame thereby allowing the pre-roll to be flushed and be made ready again.

Because the rolling buffer is not flushed until the next time the main buffer reaches capacity, if a user triggers a capture at the start of the main buffer and it has to reach back into the rolling buffer, it can. The screen shot captures are generally small enough that they can be stitched back together very quickly before adding the resulting video clip to the library. It is important that pieces of buffers are kept until it is certain they are not needed as part of a capture before they are flushed and lost forever. This is done with reference counting that which is taking place at all times to ensure that any piece of buffered video that might be needed for a future capture is saved off prior to flushing. In parallel, on-board processors are "listening" or "watching" for command input that will be used to establish the start and end points needed to reconstruct a separate clip from the main (and possibly pre-roll buffer). Rather than store the entire streamed session, the present invention uses a reactive method for recording information, such as, video that combines video capture, remote-control, gesture-recognition and voice-control technologies into an integrated system that produce cleanly edited, short-duration, compliant video files that exactly captures a moment after it has actually happened. The approach puts the user display device in a ready state that is always ready to capture information up to N minutes in the past (depending on available system memory). This enables the user to stream and acquire information from the user device screen indefinitely without having to worry about running out of storage.

In certain embodiments, the user relies on, for example, gestures recognized by the user display device and voice commands to actually initiate capture of a moment, or a button on the user device. When the user senses something is about to happen (or even after the moment has happened), they can use the appropriate, for example, voice or touch command to have the system create an information media file based on time points derived from the user's commands: Event Command (via gesture, voice or remote control): create a video file going back N seconds (user configurable) Continuing Event Command (via gesture, voice or remote control): create a file going back N seconds and ending when the user releases the hold gesture Voice Command: attach meta-data tag to video clip for automated classification.

The resulting information is automatically trimmed, tagged with meta-data (time, location and user-defined tags) and immediately available for consumption (e.g., playback, social sharing). The present disclosure provides for using a physically-backed buffer approach because the uncompressed information streams usually require too much memory to cover any significant amount of time, especially on a mobile device where battery life, cost and memory are at a premium. Both the touch-screen and microphone are listening in parallel for input that will establish the start and end points needed to reconstruct a separate clip from the main buffer and possibly pre-roll buffer.

Whether properly viewed as devices, methods, or systems, the disclosed invention also permits a machine-accessible medium containing instructions, which when executed by a machine, cause the machine to perform operations for realizing the disclosed functionality of the invention. The invention disclosed herein is realized through use of appropriate equipment and enabling logic optionally reduced to code and/or hardware, which operate to control an ad hoc array of smart phones, cell phones, tablet computers, and other devices that in the aggregate display a collective video on a digital display. This invention provides a system that allows electronic devices each capable of displaying an image or video to be arranged in an ad hoc array or mosaic and then to generate a single collective image or video (called the "target" image) in such a manner that each device displays the part of the target image or video corresponding to its relative position and size in the array or mosaic aggregate. The method of chopping the target image into pieces, one for each display device, is done so as to maximize the area of display of the target image while taking into account the aspect ratio of the target image, the aspect ratio of the array of display devices, borders along the edges of each device, and presenting the target image or video in as accurate a representation as possible.

Display devices do not need to register their position in the array or mosaic. Instead, the system of the present invention uses image processing and pattern recognition methods known to those of skill in the art to identify the position and orientation of each device (landscape, landscape inverted, portrait, portrait inverted) and send the appropriate crop from the target image or video to that device.

In order to initiate a session utilizing the present invention, a group of users place their display devices, e.g., smartphones, in an ad hoc array or mosaic on a surface, e.g., a table top. The order and orientation of the devices is completely arbitrary, and positioning of the devices within the resulting array or mosaic is random. Subsequently, a de facto feedback loop is established to assign to each display device a portion of the image or video to be played back collectively over the array of display devices. This feedback loop is based on assigning a unique visual identifier to each display device after the array has been assembled, capturing a visual "map" of those identifiers and analyzing the visual "map" to ascertain the relative location of each display device in the array, breaking down the target image or video to be displayed into portions correlating to the visual "map" of the identified display devices, and mapping back each portion of the image or video to be displayed to the corresponding display device.

Figure 3:
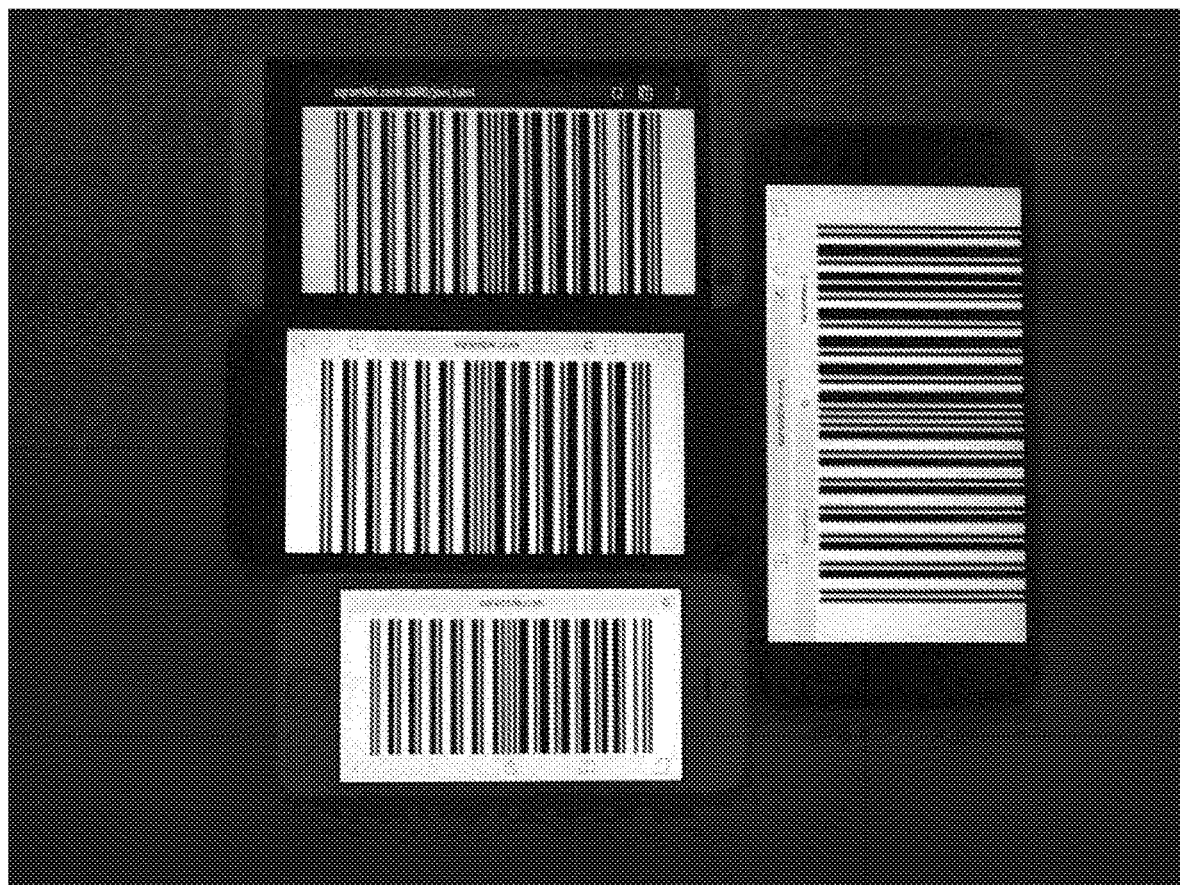
FIG. 3 is an exemplary embodiment of the array of devices with a unique graphical symbol displayed on each device.
Figure 6:
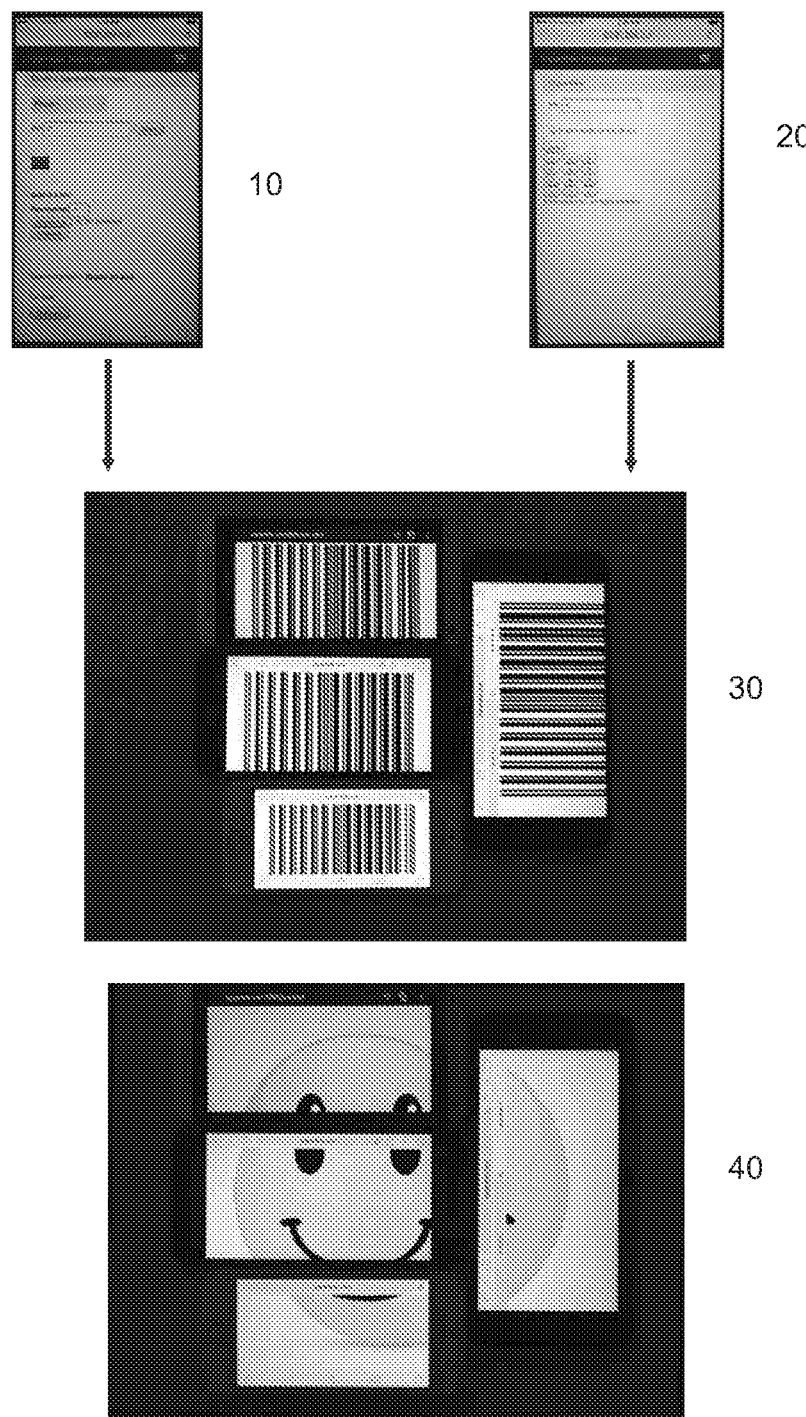
FIG. 6 is an exemplary embodiment of the process of the controller user and the display users interacting with the application, how an array of display devices could be arranged, and how the target video would be displayed over the array of display devices.

A more specific illustration of the process and method of the present invention, including the feedback loop operation, will now be presented. First, each user logs on to a display session. A display session is an instance of the application wherein all users seek to access the same image or video, referred to herein as the target video, for display. The application, consisting of software code and instructions, resides on a computer which has the ability to communicate with each user's display device, commonly referred to as a server, and locally on each users' smartphone or display device as a browser application or an organic application that the user has loaded onto that device. Suitable programs and methods for communicating between the server and the browsers on the individual users' smartphones will be known to those of ordinary skill in the art. In certain embodiments, the application, consisting of software code and instructions, resides on a controller device, a display device, or combinations thereof. The first user to log in instantiates the session using the controller application, choosing the video to be displayed and, in one embodiment of the invention, assigning a pin code to that session, as illustrated by FIG. 1 and by process 10 in FIG. 6. Each subsequent user logs into the session by entering that pin code, as illustrated by process 20, and is sent a unique identifying pattern from the server via the network connecting the server to the user's display device, for display on its screen. After all users have logged into the session, they place their phones or devices on a flat surface, e.g., a table top. Each device, with its display of its unique identifying pattern, is now visible from above. In one exemplary embodiment, this identifier is a barcode that fills most of the screen of the smartphone. When all users' devices have logged in and are positioned to form the array, as shown in FIG. 3, the controller uses his/her smartphone camera to take a picture of the array of the other display devices and uploads that image via the controller application. The controller application is operated by the first user on his smartphone. It remains separate from the array of display devices and is positioned above the array of display devices. As shown in FIG. 1, this application includes selecting the project, which correlates to one target image, setting up the pin code, instantiating the session, and then taking a picture of the array of display devices, each displaying its unique graphical code. The "choose file" button cues up the phone's camera. The user positions his phone above the array of display devices so that they are all visible in the camera viewfinder. When the user clicks the camera switch, a photo is taken and uploaded to the server for processing.

The present invention then uses image processing techniques, of the type which anyone versed in the art would be aware of, and analyzes the image uploaded by the controller.

It identifies each of the unique patterns in the image, uses edge detection to determine the (x,y) coordinates for each corner of each unique pattern, and deduces and calculates the position and orientation of each individual device from its pattern. The system further has information about the make, model, and screen resolution of each display device, which was communicated to the server when the display devices logged in to the session. Based on the image analysis and information about the display device screens, the target image or video is mapped to the array of display devices such as to optimize and maximize the display of the target image or video.

Figure 4:
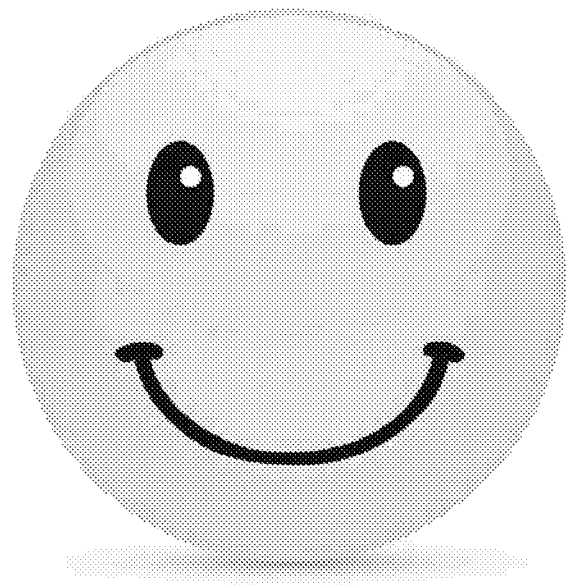
FIG. 4 is an exemplary embodiment of a video being played over the whole device array. For reference the source image is also shown.
Figure 4:

Employing techniques known to those of ordinary skill in the art, the center of the target image and the center of the device array are first calculated, then the aspect ratios of the target image or video and the device array are compared, yielding a scaling factor, rotational factor, and a translation factor. Further the borders surrounding each device are taken into account. These factors are applied to the target image or video to divide or break the target video into sub-images or sub-videos. This process is a mathematical calculation that would be known by anyone of ordinary skill in the art. For example, matrix mathematics can be employed, where the coordinates of the corners of the screen of each display device are contained in a matrix and the scaling and translation factors are contained in other matrices and they are multiplied together. Each sub-image or sub-video corresponds exactly to what one display device in the array will display. One sub-image or sub-video is sent to each device in the array, which the device displays on its screen. The controller device communicates with the server to initiate the server to command all of the other display devices logged into the session to commence playing the target video. Playback is buffered and streamed to account for varying data rates that different display devices in the array may have, such that all devices' videos are synchronized in time as if the whole device array were one big contiguous screen, as shown in FIG. 4.

Figure 7:
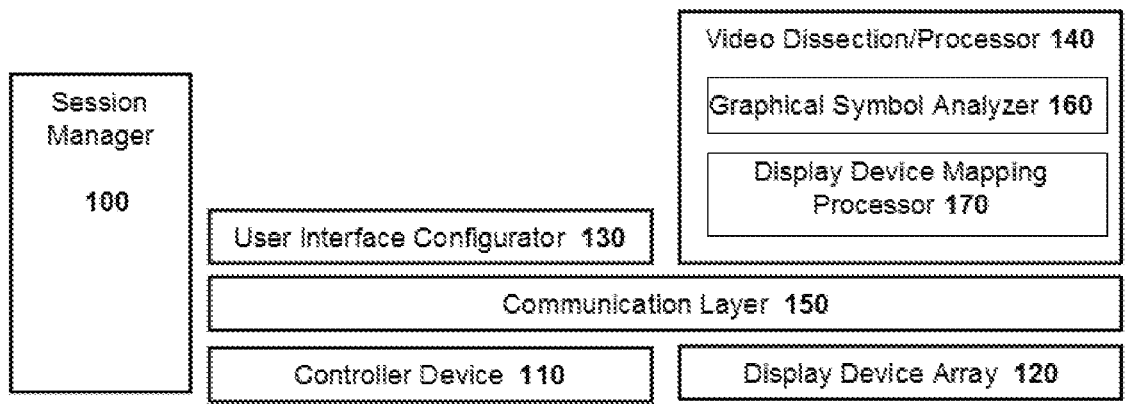
FIG. 7 is an exemplary embodiment of the individual application components that perform the various functions and algorithms to implement the user interface and the feedback loop between the array of display devices and the application.

As illustrated in FIG. 7, the session manager 100 controls the functions of all of the other components of the system. The session manager resides on the server and uses commonly-known techniques to control the session. In one exemplary embodiment, internet/web protocols including java, MSSL, http, https, html5, and Ajax are employed to manage the session and coordinate the flow of information between the server and the various users' devices. The controller user's device is represented by 110 and the other users' display devices are represented by 120. A communication layer 150 accomplishes the sending and receiving of information and signals from the controller device 110 and the display devices 120 using, in alternative embodiments, Html 5 and Ajax in a browser session, or a local application on each device (commonly called an "app"). A user interface configurator 130 creates the physical layout, i.e., what a user sees collectively presented on the displays of the devices in the array, from software code and algorithms that generate the layout and change the layout based on where the application is in its overall sequence of processes. The information presented on each display device at any time is managed via programs and algorithms that would be known to those of ordinary skill in the art. A video dissection/processor 140 comprising a set of programs and algorithms incorporates a graphical symbol analyzer 160 that takes the image uploaded by the controller user and extracts the symbol identifier and values and coordinates of each display device in the array, utilizing image processing techniques including edge detection and symbol decoding as disclosed above to calculate an (x,y) coordinate for each corner of the screen in each display device, in a manner that would be known by those of ordinary skill in the art. The coordinates for each display device screen are then mapped to the target video by a display device mapping processor 170, which creates a set of (x,y) coordinates for the corners of each specific sub-video that will be sent to each specific display device. This calculation uses the center of the image of the array devices, the center of the target image, and the aspect ratios of the target image and the array to maximize the display of the video on the array of display devices. Applying video processing routines and techniques that would be known to anyone of ordinary skill in the art, each sub-image is created and stored on the server. The session manager then sends the appropriate sub-video to each display device, where it is displayed on the device's screen. Using web streaming and buffering algorithms and protocols which would be known to those of ordinary skill in the art, when the controller user presses the "play" button on his device, all display devices commence to play their respective sub-videos at the same time so that all sub-videos are played in synchronization in time and the array appears to be one large contiguous display screen playing the target video. In one exemplary embodiment of the invention, the distribution and presentation of sub-videos on the respective display devices is accomplished by creating a web socket for each device.

A client application, consisting of executable code and algorithms, is either loaded onto each display device via a browser session or pre-loaded via a downloadable application (commonly known as an app). The creation of such a web socket and the client code would be familiar to those of ordinary skill in the art. The system uses http requests to cache BLOB ("Binary Large Object Files") on each device until they are fully buffered on the device. Using a looping structure in the server application software, when the control user presses the "play" button, a loop sequentially sends out a message to command each client application to begin playing its sub-video. Because the time to loop through all devices takes microseconds (millionths of a second), each display device begins playing within one-tenth of a second of the others. Because of the buffering of the video on the client applications, the video continues to play continuously and in synchronization in spite of any latency in communicating with any display device. This implementation of buffering would be very familiar to anyone of ordinary skill in the art.

Figure 5:
FIG. 5 is an exemplary embodiment of a video with a border for an advertising logo played over the whole device array. For reference the source image is also shown.

Due to the large size of the effective display created by the array of devices, ample room exists to display a banner or border around the video during playback. The process of modifying the video, before it is cut into constituent pieces or sub-videos and sent to the array of display devices to incorporate such a border or banner, would be very familiar to anyone who is versed in the art. As the video plays back, the viewers can see the banner or border sponsorship or advertising content. FIG. 5 shows this process.

The present invention also has functions for session management, adding and managing images and videos, and accessing device information.

Generally the present invention uses an application server, consisting of a computer, an operating system, a network communication protocol, and specially written computer programs and executable files, to send images or videos. An intelligent engine (a computer program) running on the application server interprets inbound images, calculates the most optimal way to map the target image or video to the array of display devices, separates the target image or video into the constituent pieces for each display device logged in, and sends the appropriate piece to each display device.

While the foregoing and accompanying drawings are directed to example embodiments of the disclosed invention herein, other and further embodiments of the invention may be devised without departing from the basic scope thereof.

Although a preferred embodiment of the invention (currently marketed as the "Sqramble" system available at www.sqramble.com) has been described herein, it is recognized that modifications and variations will occur to those skilled in the art which fall within the spirit of the invention and intended scope of the appended claims.

The invention claimed is:

1. A method for sharing information amongst user display devices in a peer to peer (P2P) network, the method comprising:
   providing a plurality of user display devices wherein said user display devices are mobile or portable and which are capable of wireless communications;
   establishing said user display devices as nodes of a wireless P2P network,
   providing an application on said user display devices, wherein said application is configured to continuously record a rolling window of information from the users display device, further wherein said application gives each user of a respective user display device the ability to select information to be shared amongst the other user display devices in the wireless P2P network;
   selecting the information to be shared over the wireless P2P network by one of the users using his/her respective user display device; and
   wherein said selected information is shared over the wireless P2P network as an information transmission using the application, said selected information comprising a multimedia file selected from the group consisting of voice data, media files, image files, audio files, game images, screen images, a virtual world, an augmented reality, a game, a videogame, on-screen content, broadcast programming, a mixed reality other rendered environment, metadata, and combinations thereof.

2. The method of claim 1 wherein said selected information comprises a duration of time selected from the group consisting of 20 seconds, 40 seconds, and 60 seconds long.

3. The method of claim 1 said recorded information can be saved to said user's display device based on a user command selected from the group consisting of the user tapping a button, the user tapping one or more buttons, the user tapping on an icon on the screen of said user's display device, a gesture of the user, shaking said user display device by the user, an audible instruction or command issued by the user, and combinations thereof.

4. The method of claim 3 wherein said user command is actuated by touching a touch screen portion of said first user's display device.

5. The method of claim 3 wherein said user command is actuated by a virtual button on said first user's display device.

6. The method of claim 3 wherein said user command is a spoken command into a microphone associated with said user's display device.

7. The method of claim 3 wherein said user command is a hold and release touch to a touch screen, wherein said application only begins to save information for a predetermined number of seconds before the user activates a virtual button in said touch screen and said application stops saving information when the first user releases said virtual button.

8. The method of claim 7 wherein said predetermined number of seconds is selected form the group consisting of 20 seconds, 40 seconds, and 60 seconds.

9. The method of claim 1 wherein selected information can be saved directly to said user's display device or transmitted to other user's display devices over said wireless P2P network without using a server.

10. The method of claim 1 wherein each of said user display devices is selected from the group consisting of mobile telephones, smart tablet computers, laptop computers, portable gaming devices, portable Internet devices, personal digital assistant devices, wearable devices, smart watches, smart glasses, headphones, pendants, earpieces, any electronic, computing, and/or telecommunications device capable of wireless communication.

11. The method of claim 1 wherein the wireless P2P network is any one of a structured network, a predefined network, a hybrid P2P network, an ad hoc P2P network, an unstructured network, or a combination thereof.

12. The method of claim 1 wherein said selected information is shared amongst user display devices in the wireless P2P network without use of a server.

13. The method of claim 1 where any one of the users can choose any portion of said information being transmitted to receive and retransmit, without using a server.

14. The method of claim 1 wherein said information is shared amongst certain user display devices which are separated from each other by multiple hops in the wireless P2P network.

15. The method of claim 1 wherein the wireless P2P network is formed using a means selected from the group consisting of Bluetooth connections, WiFi connections, and combinations thereof.

16. The method of claim 1 wherein a local network is a P2P ad-hoc network that is dynamically formed between user display devices in said local network.

17. The method of claim 1 wherein said wireless P2P network is an ad hoc network formed between user display devices, wherein the user display devices cooperatively route traffic amongst themselves.

18. The method of claim 1 wherein a portion of said user display devices are separated from each other by multiple hops in the ad hoc network.

19. The method of claim 1 wherein said wireless P2P network includes at least some user display devices separated from each other by multiple hops in the network.

20. The method of claim 1 wherein said application is configured for sharing information with said other user display devices in real time with less than 100 ms latency over said wireless P2P network.

21. The method of claim 1 wherein said application is configured for retransmitting information transmissions received over said wireless P2P network from one or more user display devices to additional user display devices connected on said wireless P2P network.

22. The method of claim 1 wherein said application is configured for mirroring a first user display device screen, a video camera associated with said first user display device screen, a microphone associated with said first user display device, or any multi-media application associated with said first user device display device screen to form mirrored content, and sharing said mirrored content over said wireless P2P network.

23. The method of claim 22 wherein said application is configured for recording said mirrored content.

24. The method of claim 1 wherein said multimedia file is a videogame or a performance.

25. The method of claim 1 wherein said multimedia file is a recording of the performance of a test software that is configured for analysis of the performance of said test software to record software failure.

26. The method of claim 1 wherein said multimedia file is distributively generated by a subset of user devices on said wireless P2P network.

27. The method of claim 1 wherein said multimedia file is distributed by a user display device.

28. The method of claim 1 wherein the multimedia file is requested by other user display devices on said P2P network.

29. A method for recording information, the method comprising:

providing a user display device wherein said user display device is mobile or portable and which is capable of wireless communications;

providing an application on said user display device, wherein said application is configured to continuously record a rolling window of information from the user display device, further wherein said application gives the user of the user display device the ability to select information to be recorded;

selecting the information to be recorded by the user using the user display device; and wherein said selected information is recorded using the application, further said selected information comprising a multimedia file selected from the group consisting of voice data, media files, image files, audio files, game images, screen images, a virtual world, an augmented reality, a game, a videogame, on-screen content, broadcast programming, a mixed reality other rendered environment, metadata, and combinations thereof, wherein said user display device is selected from the group consisting of mobile telephones, smart tablet computers, laptop computers, portable gaming devices, portable Internet devices, personal digital assistant devices, wearable devices, smart watches, smart glasses, headphones, pendants, earpieces, any electronic, computing, and/or telecommunications device capable of wireless communication.

30. The method of claim 29 wherein said recorded information comprises a duration of time selected from the group consisting of 20 seconds, 40 seconds, and 60 seconds long.

31. The method of claim 29 wherein said recorded information can be saved to said user's display device based on a user command selected from the group consisting of the user tapping a button, the user tapping one or more buttons, the user tapping on an icon on the screen of said user's display device, a gesture of the user, shaking said user display device by the user, an audible instruction or command issued by the user, and combinations thereof.

32. The method of claim 31 wherein said user command is actuated by touching a touch screen portion of said first user's display device.

33. The method of claim 31 wherein said user command is actuated by a virtual button on said first user's display device.

34. The method of claim 31 wherein said user command is a spoken command into a microphone associated with said user's display device.

35. The method of claim 31 wherein said user command is a hold and release touch to a touch screen, wherein said application only begins to save information for a predetermined number of seconds before the user activates a virtual button in said touch screen and said application stops saving information when the first user releases said virtual button.

36. The method of claim 35 wherein said predetermined number of seconds is selected form the group consisting of 20 seconds, 40 seconds, and 60 seconds.

37. The method of claim 29 wherein said multimedia file is a videogame or a performance.

38. The method of claim 29 wherein said multimedia file is a recording of the performance of a test software that is configured for analysis of the performance of said test software to record software failure.

* * * * *